(12) United States Patent
Kinoshita et al.

(10) Patent No.: US 10,823,348 B2
(45) Date of Patent: Nov. 3, 2020

(54) LIGHTING APPARATUS, LINE SENSOR ASSEMBLY, READING APPARATUS, AND PRINTING APPARATUS

(71) Applicant: CANON COMPONENTS, INC., Kodama-gun, Saitama-ken (JP)

(72) Inventors: Junya Kinoshita, Saitama-ken (JP); Junichi Kato, Saitama-ken (JP)

(73) Assignee: CANON COMPONENTS, INC., Saitama (JP)

( * ) Notice: Subject to any disclaimer, the term of this patent is extended or adjusted under 35 U.S.C. 154(b) by 90 days.

(21) Appl. No.: 16/052,002

(22) Filed: Aug. 1, 2018

(65) Prior Publication Data

US 2019/0041014 A1 Feb. 7, 2019

(30) Foreign Application Priority Data

Aug. 7, 2017 (JP) .................................. 2017-152693
Jul. 27, 2018 (JP) .................................. 2018-141566

(51) Int. Cl.
*F21S 8/02* (2006.01)
*F21V 19/00* (2006.01)
*F21V 7/22* (2018.01)
*H04N 1/028* (2006.01)
*H04N 1/031* (2006.01)
*H04N 1/00* (2006.01)

(52) U.S. Cl.
CPC .................. *F21S 8/02* (2013.01); *F21V 7/22* (2013.01); *F21V 19/00* (2013.01); *H04N 1/00557* (2013.01); *H04N 1/02865* (2013.01); *H04N 1/0312* (2013.01)

(58) Field of Classification Search
CPC ..... F21S 8/02; H04N 1/00557; H04N 1/0312; H04N 1/02865; F21V 7/22; F21V 19/00
See application file for complete search history.

(56) References Cited

U.S. PATENT DOCUMENTS

| | | | | |
|---|---|---|---|---|
| 4,667,277 | A * | 5/1987 | Hanchar | F21S 2/005 340/815.73 |
| 5,660,461 | A * | 8/1997 | Ignatius | F21V 29/004 257/668 |
| 6,659,622 | B2 * | 12/2003 | Katogi | H05B 45/46 362/219 |
| 2013/0094091 | A1 * | 4/2013 | Kobayashi | G02B 5/005 359/619 |
| 2013/0258426 | A1 * | 10/2013 | Tsumekawa | H04N 1/028 358/475 |

(Continued)

FOREIGN PATENT DOCUMENTS

JP 2015053190 A 3/2015

*Primary Examiner* — Isiaka O Akanbi
*Assistant Examiner* — Glenn D Zimmerman
(74) *Attorney, Agent, or Firm* — Rossi, Kimms & McDowell LLP

(57) ABSTRACT

There is provided with a lighting apparatus. An elongated first light emission unit and an elongated second light emission unit each extend in a longer side direction and a shorter side direction. The first light emission unit and the second light emission unit have respective end portions in the longer side direction that are connected to each other via a restricting mechanism having a shape that restricts relative movement of the first and second light emission units in the shorter side direction.

12 Claims, 3 Drawing Sheets

(56) References Cited

U.S. PATENT DOCUMENTS

| | | | |
|---|---|---|---|
| 2013/0343025 A1* | 12/2013 | Bdeir | H01R 13/6205 |
| | | | 361/803 |
| 2014/0111835 A1* | 4/2014 | Ozawa | H04N 1/02815 |
| | | | 358/475 |
| 2015/0062670 A1* | 3/2015 | Yoshida | H04N 1/02835 |
| | | | 358/482 |
| 2015/0365555 A1* | 12/2015 | Kinoshita | G01J 1/04 |
| | | | 358/484 |
| 2016/0092147 A1* | 3/2016 | Nakamura | G06F 3/1219 |
| | | | 358/1.6 |
| 2017/0064124 A1* | 3/2017 | Yoshida | H04N 1/0057 |
| 2017/0064125 A1* | 3/2017 | Tsumekawa | H04N 1/02855 |

* cited by examiner

LIGHTING APPARATUS, LINE SENSOR ASSEMBLY, READING APPARATUS, AND PRINTING APPARATUS

BACKGROUND OF THE INVENTION

Field of the Invention

The present invention relates to a lighting apparatus, a line sensor assembly, a reading apparatus, and a printing apparatus.

Description of the Related Art

Optical reading apparatuses that read an object by irradiating light from a light source portion onto the object, condensing light reflected by the object and guiding the reflected light to a sensor are known. For a lighting apparatus that is used as the light source portion in the case of using a line sensor as the sensor, an elongated light source portion is used, in order to irradiate light onto a linear area of an object that is conveyed. Japanese Patent Laid-Open No. 2015-53190 discloses an elongated LED lighting apparatus having two LED substrates provided in series.

SUMMARY OF THE INVENTION

According to an embodiment of the present invention, a lighting apparatus comprising: an elongated first light emission unit and an elongated second light emission unit each extend in a longer side direction and a shorter side direction, wherein the first light emission unit and the second light emission unit have respective end portions in the longer side direction that are connected to each other via a restricting mechanism having a shape that restricts relative movement of the first and second light emission units in the shorter side direction.

According to another embodiment of the present invention, a lighting apparatus comprising: an elongated first light emission unit and an elongated second light emission unit that extend in a longer side direction and a shorter side direction, wherein the first light emission unit and the second light emission unit are connected to each other at respective end portions in the longer side direction, and each of the first light emission unit and the second light emission unit has a main surface with a shape for interconnection, wherein the shape for interconnection connects the first light emission unit and the second light emission unit and restricts relative movement in the shorter side direction.

According to still another embodiment of the present invention, a lighting apparatus comprising: an elongated first light emission unit and an elongated second light emission unit that extends in a longer side direction and a shorter side direction, wherein the first light emission unit and the second light emission unit are connected to each other at respective end portions in the longer side direction, and the first light emission unit and the second light emission unit have respective end portion surfaces opposing with each other, wherein each of the end portion surfaces has a shape for interconnection, and the shape for interconnection connects the first light emission unit and the second light emission unit and restricts relative movement in the shorter side direction.

According to yet another embodiment of the present invention, a printing apparatus comprising: a reading sensor including a line sensor configured to detect light; and a printer configured to print on a medium, wherein the printer is further configured to perform printing on the medium that has undergone reading by the reading sensor.

Further features of the present invention will become apparent from the following description of exemplary embodiments (with reference to the attached drawings).

DESCRIPTION OF THE EMBODIMENTS

Figure 1:
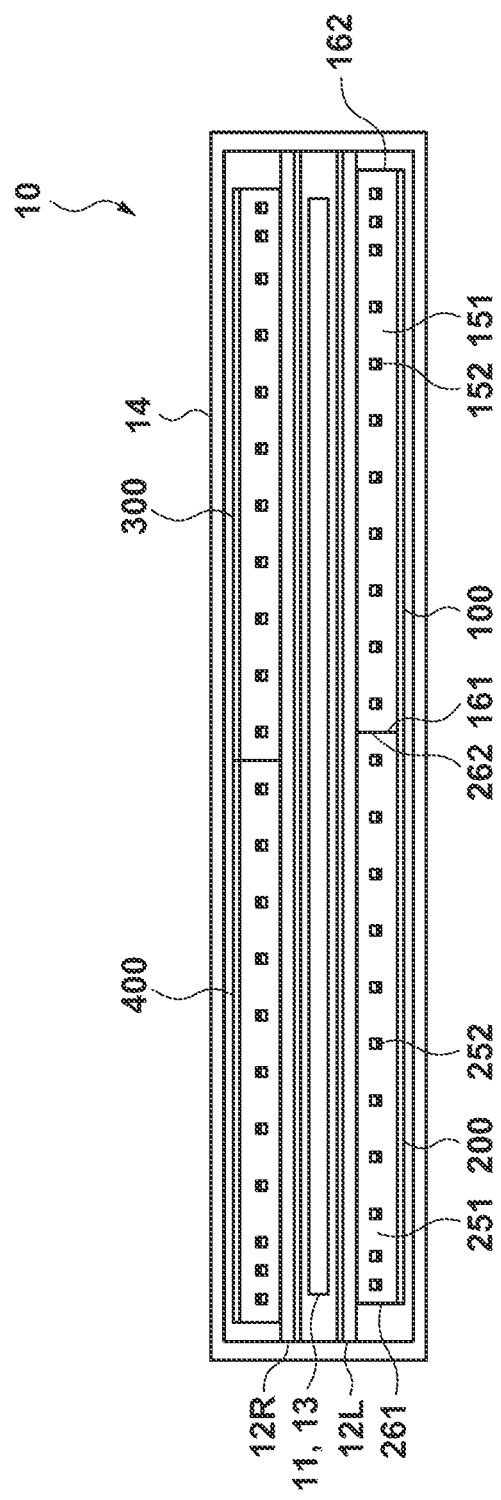
FIG. 1 is a top view of a lighting apparatus according to one embodiment.

Reading apparatuses are required to irradiate light onto an object such that a desired illumination distribution is obtained. On the other hand, in the case where the technology described in Japanese Patent Laid-Open No. 2015-53190 relating to building lighting is applied to a reading apparatus, there is a problem in that the desired illumination distribution is not obtained, due to positional shift between a plurality of light source portions such as LED substrates. It is thought that positional shift between the plurality of light source portions, particularly in a direction orthogonal to the longer side direction, greatly affects the illumination distribution.

An embodiment of the present invention provides a lighting apparatus with which a desired illumination distribution can be obtained by combining two or more light emission units.

A lighting apparatus 10 according to one embodiment of the present invention will be described with reference to FIG. 1. The lighting apparatus 10 according to one embodiment of the present invention includes an elongated first light emission unit 100 and an elongated second light emission unit 200.

The first light emission unit 100 and the second light emission unit 200 each have a main surface that extends in an X direction, which is the longer side direction, and a Y direction, which is the shorter side direction (e.g., rectangular, parallelogram, etc.). The main surface indicates a principle surface of the light emission units. In one embodiment, the light emission units have shapes with thickness that extend in a tabular manner, and in this case a surface that extends in a tabular manner (front surface or back surface) can be referred to as a main surface. In one embodiment, the light emission units include a tabular substrate and a light source provided on the substrate. In this case, a substrate surface (front surface or back surface) can be referred to as a main surface. The longer side direction of the substrate surface corresponds in the X direction, and the shorter side direction of the substrate surface (direction perpendicular to the longer side direction) corresponds in the Y direction. The surface of the light emission units on which the light source is provided can also be referred to as a main surface. Furthermore, the light emission units can be provided on a placement surface of a casing, and the surface of the light emission units along this placement surface can also be referred to a main surface. FIG. 1 shows an external view of the first light emission unit 100 and the second light emission unit 200 as seen from the main surface side.

End portions of the first light emission unit 100 and the second light emission unit 200 in the longer side direction are connected to each other. In FIG. 1, the first light emission unit 100 and the second light emission unit 200 are connected in series, and are aligned in a straight line. Also, the first light emission unit 100 has a first end portion 161 and a second end portion 162, which are end portions of the first light emission unit 100 in the longer side direction. Also, the second light emission unit 200 has a first end portion 261 and a second end portion 262, which are end portions of the second light emission unit 200 in the longer side direction. In the example in FIG. 1, the first end portion 161 of the first light emission unit 100 is connected to the second end portion 262 of the second light emission unit 200.

The first light emission unit 100 and the second light emission unit 200 are connected to each other via a restricting mechanism. The restricting mechanism has a shape that restricts relative movement of the first light emission unit 100 and the second light emission unit 200 in the shorter side direction (Y direction). For example, the restricting mechanism is able to fix the relative positional relationship of the first light emission unit 100 and the second light emission unit 200, such that the first light emission unit 100 and the second light emission unit 200 do not move relatively. In one embodiment, the first light emission unit 100 and the second light emission unit 200 are substantially flat members having a predetermined length (length in the longer side direction), a predetermined width (length in the shorter side direction) and a predetermined thickness. In such an embodiment, the restricting mechanism is able to restrict relative movement of the first light emission unit 100 and the second light emission unit 200 in the width direction, for example. In one embodiment, the restricting mechanism is able to fix the relative positional relationship, such that the first light emission unit 100 and the second light emission unit 200 contact each other.

Figure 2:
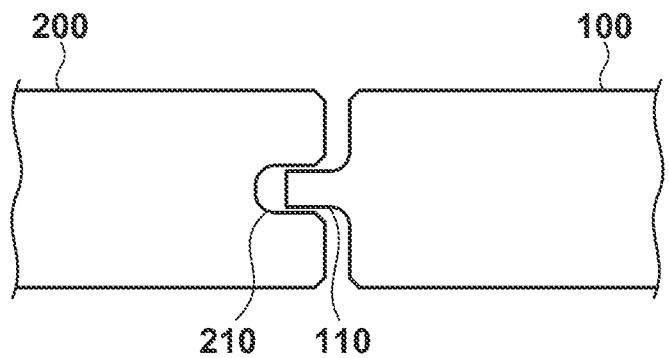
FIG. 2 is a top view of connecting portions of light emission units according to one embodiment.

Hereinafter, an example of the restricting mechanism will be described, with reference to FIG. 2. FIG. 2 is an external view of connecting portions of the first light emission unit 100 and the second light emission unit 200 in one embodiment from the main surface side. The restricting mechanism shown in FIG. 2 is formed by a protruding portion 110 that is formed on the first end portion 161 of the first light emission unit 100, and an engaging portion 210 that is formed in the second end portion 262 of the second light emission unit 200 and engages the protruding portion 110. The protruding portion 110 and the engaging portion 210 can be constituted such that, when engaged or when moving relative to each other in a direction orthogonal to the longer side direction, the side surface of the protruding portion 110 contacts the side surface of the engaging portion 210. For example, the protruding portion 110 and the engaging portion 210 can be constituted such that, when engaged, the side surfaces in the shorter side direction face each other. Also, the protruding portion 110 and the engaging portion 210 can be constituted such that, when engaged or when moving relative to each other in a direction orthogonal to the longer side direction, the side surfaces in the shorter side direction contact each other. According to such a restricting mechanism, positional shift in the shorter side direction can be suppressed, when connecting the end portions of the first light emission unit 100 and the second light emission unit 200 to each other. In FIG. 2, a left-right direction corresponds in the longer side direction (length direction), an up-down direction corresponds in the shorter side direction (width direction), and a front-back direction corresponds in the thickness direction. In the case of using such a configuration, an adhesive need not be used in connecting the first light emission unit 100 and the second light emission unit 200, and positional shift of the light emission units can be suppressed even in this case. Note that, even in the case where the light emission units shift at an angle, it can be said that there is shift in the Y direction in the case where a Y component exists when the shift direction is broken down into X and Y components. That is, in one embodiment, the restricting mechanism is able to suppress positional shift (relative movement) of the light emission units in directions that include a Y direction (shorter side direction) component.

In this way, in one embodiment, the first light emission unit 100 and the second light emission unit 200 respectively have shapes (e.g., the protruding portion 110 and the engaging portion 210) on main surfaces. Relative movement in the shorter side direction (Y direction) is restricted as a result of such shapes, that is, by the light emission units being connected via main surface end portions that are not straight. In one example, the end portion of the main surface at the connecting portion of the first light emission unit 100 has a protruding shape, and the end portion of the main surface at the connecting portion of the second light emission unit 200 has a shape that engages the protruding shape of the first light emission unit 100.

Figure 3A:
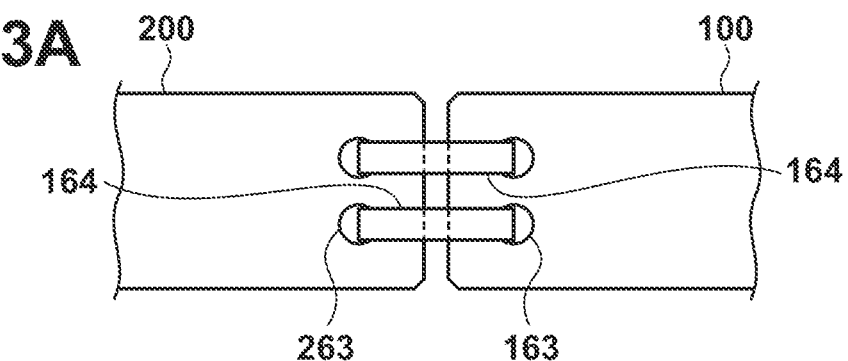
FIGS. 3A to 3C are top views of connecting portions of light emission units according to one embodiment.
Figure 3B:
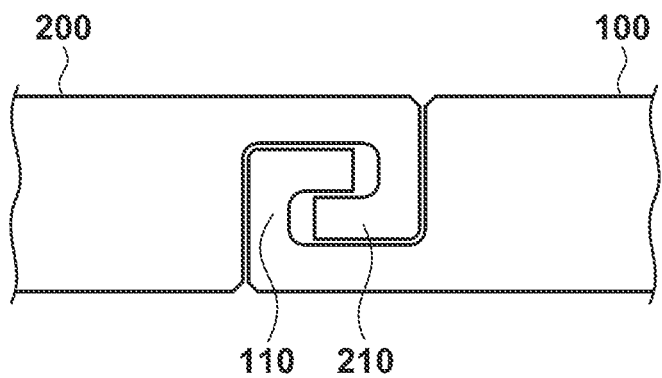

Another example of the restricting mechanism will be described, with reference to FIG. 3B. FIG. 3B is an external view of the connecting portions of the first light emission unit 100 and the second light emission unit 200 in another embodiment from the main surface side. In FIG. 3B, the protruding portion 110 and the engaging portion 210 that constitute the restricting mechanism each have a key-like shape, and are engaging each other. In this example, the protruding portion 110 and the engaging portion 210, when engaged, contact each other at side surfaces in the shorter side direction, and also contact each other at side surfaces in the longer side direction. According to such a configuration, positional shift in the shorter side direction can be suppressed, and positional shift in the longer side direction can also be suppressed, when connecting end portions of the first light emission unit 100 and the second light emission unit 200 with each other.

Figure 3C:
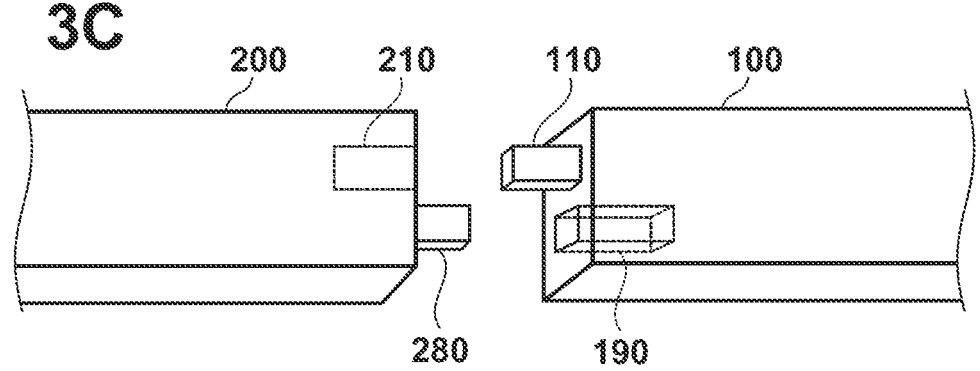

Another example of the restricting mechanism will be described, with reference to FIG. 3C. FIG. 3B shows the connecting portions of the first light emission unit 100 and the second light emission unit 200 in another embodiment. Note that FIG. 3C shows the connecting portions before being connected to each other. In FIG. 3C, the protruding portion 110 constituting the restricting mechanism is a raised portion that has a shape protruding from the end portion opposing surface of the first light emission unit 100 at the connecting portion. Also, the engaging portion 210 constituting the restricting mechanism is a recessed portion that has a shape recessed from the end portion opposing surface of the second light emission unit 200 at the connecting portion, and engages the raised portion of the first light emission unit 100. That is, the first light emission unit 100 and the second light emission unit 200 respectively have shapes (e.g., the protruding portion 110 and the engaging portion 210) in end portion opposing surfaces. Relative movement in the shorter side direction (Y direction) is restricted as a result of such shapes, that is, by the light emission units being connected via the end portion opposing surfaces that are not flat. As shown in FIG. 3C, the second light emission unit 200 may further have a raised portion 280 on the end portion opposing surface, and the first light emission unit 100 may further have a recessed portion 190 that engages the raised portion 280 in the end portion opposing surface.

A further example of the restricting mechanism will be described, with reference to FIG. 3A. FIG. 3A is an external view of the connecting portions of the first light emission unit 100 and the second light emission unit 200 in the further embodiment from the main surface side. In FIG. 3A, the restricting mechanism is formed by an interconnecting portion 164, a connecting portion 163 and a connecting portion 263. The interconnecting portion 164 is an interconnecting member that interconnects the first light emission unit 100 and the second light emission unit 200. The connecting portion 163 is provided in the first end portion 161 of the first light emission unit 100, and connects to the interconnecting portion 164. The connecting portion 263 is provided in the end portion of the second light emission unit 200, and connects to the interconnecting portion 164.

In one embodiment, as shown in FIG. 3A, the connecting portions 163 and 263 are latching holes provided in the end portions of the first light emission unit 100 and the second light emission unit 200. End portions of the interconnecting portion 164 can be inserted into the connecting portions 163 and 263 and fixed. According to such a configuration, the distance between the connecting portions 163 and 263 can be fixed. Accordingly, relative positional shift can be suppressed, by interconnecting the first light emission unit 100 and the second light emission unit 200 using the interconnecting portion 164, such that the first end portion 161 and the second end portion 262 contact each other.

Although, in FIG. 3A, there are two each of the interconnecting portion 164 and the connecting portions 163 and 263, the numbers thereof are not particularly limited. Also, the method of connecting the interconnecting portion 164 to the connecting portions 163 and 263 is also not particularly limited. For example, the interconnecting portion 164 may be a band-like metal strip, and may be another material or have another shape.

The specific configuration of the first light emission unit 100 and the second light emission unit 200 is not particularly limited. For example, the first light emission unit 100 and the second light emission unit 200 may be the same light emission unit. Also, the length in the longer side direction may differ between the first light emission unit 100 and the second light emission unit 200. By providing and connecting the light emission units of different lengths, light emission portions having various lengths can be realized. In one embodiment, in order to facilitate connection, the end face of the first end portion 161 of the first light emission unit 100 is the same size as the end face in the second end portion 262 of the second light emission unit 200.

In one embodiment, the elongated first light emission unit 100 includes an elongated first substrate 151 and a first light source group 152 provided on a substrate of the first substrate 151. Also, the elongated second light emission unit 200 includes an elongated second substrate 251 and a second light source group 252 provided on a substrate of the second substrate 251. Here, the first substrate 151 and the second substrate 251 can be connected flush, such that end portions in the longer side direction face each other. For example, the first substrate 151 and the second substrate 251 can be connected such that the surfaces of the substrates are aligned flush with each other. The first substrate 151 and the second substrate 251 can also be disposed with supporting members flush.

In the example in FIG. 1, the first substrate 151 and the second substrate 251 are connected such that end portions in the longer side direction face each other, via the restricting mechanism. For example, the first substrate 151 can have the protruding portion 110, and the second substrate 251 can have the engaging portion 210. Also, the first substrate 151 may have the connecting portion 163, and the second substrate 251 may have the connecting portion 263. In such a configuration, the restricting mechanism is able to restrict relative movement between the first substrate 151 and the second substrate 251 in the shorter side direction, along the first substrate 151 and the second substrate 251.

The first light source group 152 and the second light source group 252 are provided with a plurality of light sources. The type of light source that the first light source group 152 and the second light source group 252 are provided with is not particularly limited. For example, the light source may be an LED (light emitting diode), or may be other light emitting elements. In one embodiment, the first light source group 152 can be an LED array in which a plurality of LEDs (light emitting diodes) are arrayed in the longer side direction of the first substrate 151. Also, the second light source group 252 may be an LED array in which a plurality of LEDs are arrayed in the longer side direction of the second substrate 251.

In one embodiment, in the first light emission unit 100, the light emission amount of the second end portion 162, which is on the opposite end portion side to the first end portion 161, is larger than the light emission amount of the first end portion 161, which is on the end portion side that is connected to the second light emission unit 200. The second light emission unit 200 exists on the first end portion 161 side, but since there is no adjacent light emission unit on the second end portion 162 side, there tends to be a deficiency in the amount of projected light on the second end portion 162 side. On the other hand, realizing a uniform amount of projected light across the entirety in the longer side direction is facilitated, by increasing the light emission amount on the second end portion 162 side. As a specific example, such a configuration can be realized by increasing the disposition density of the light sources on the second end portion 162 side to be higher than on the first end portion 161 side. For example, in the example in FIG. 1 using LEDs as the light source, the disposition density of the LEDs on the second end portion 162 side is higher than on the first end portion 161 side. Similarly, the second light emission unit 200 can also be configured such that the first end portion 261 side on the opposite side to the second end portion 262 has a larger light emission amount than the second end portion 262 that is connected to the first light emission unit 100.

In the lighting apparatus according to the present embodiment, relative positional shift between the first light emission unit 100 and the second light emission unit 200 in a direction orthogonal to the longer side direction can be suppressed. When arranging two or more light emission units in a line to produce a more elongated lighting apparatus, the distribution of the amount of light projected onto an object that is irradiated can thus be approximated to a desired distribution. Also, by using the restricting mechanism, accurately arranging the first light emission unit 100 and the second light emission unit 200 in a line in the longer side direction is facilitated. For example, as shown in FIG. 1, in one embodiment, the lighting apparatus has a structure in which the first light emission unit 100 and the second light emission unit 200 are provided in a casing (outer side supporting member 14). Such a lighting apparatus can be manufactured by arranging the first light emission unit 100 and the second light emission unit 200 in a line on the surface of the casing. At this time, by using the restricting mechanism, disposition of the first light emission unit 100 and the second light emission unit 200 so as to not shift a direction orthogonal to the longer side direction is facilitated. Note that the first light emission unit 100 and the second light emission unit 200 can further be fixed to the casing using a fixed member such as a screw.

Here, a lighting apparatus including two light emission units was described. However, the number of light emission units that are included in the lighting apparatus is not restricted. For example, as shown in FIG. 1, the lighting apparatus may include a third light emission unit 300 and a fourth light emission unit 400, in addition to the first light emission unit 100 and the second light emission unit 200. Here, the third light emission unit 300 and the fourth light emission unit 400 can have a similar configuration to the first light emission unit 100 and the second light emission unit 200. For example, the end portions of the third light emission unit 300 and the fourth light emission unit 400 in the longer side direction may be connected to each other via a restricting mechanism that restricts relative movement in a direction orthogonal to the longer side direction. Also, the lighting apparatus may have a structure in which three or more light emission units are connected. In this case, the three or more units may be respectively connected via a restricting mechanism that restricts relative movement in a direction orthogonal to the longer side direction.

Such a lighting apparatus can be used as a lighting apparatus for a line sensor assembly. Hereinafter, a line sensor assembly that includes the lighting apparatus according to the present embodiment will be described. The line sensor assembly according to one embodiment includes a casing, the lighting apparatus according to the present embodiment, a lens array, and a line sensor. Hereinafter, an example of the line sensor assembly will be described, with reference to FIG. 4. Note that FIG. 1 corresponds to a top view of the line sensor assembly shown in FIG. 4.

Figure 4:
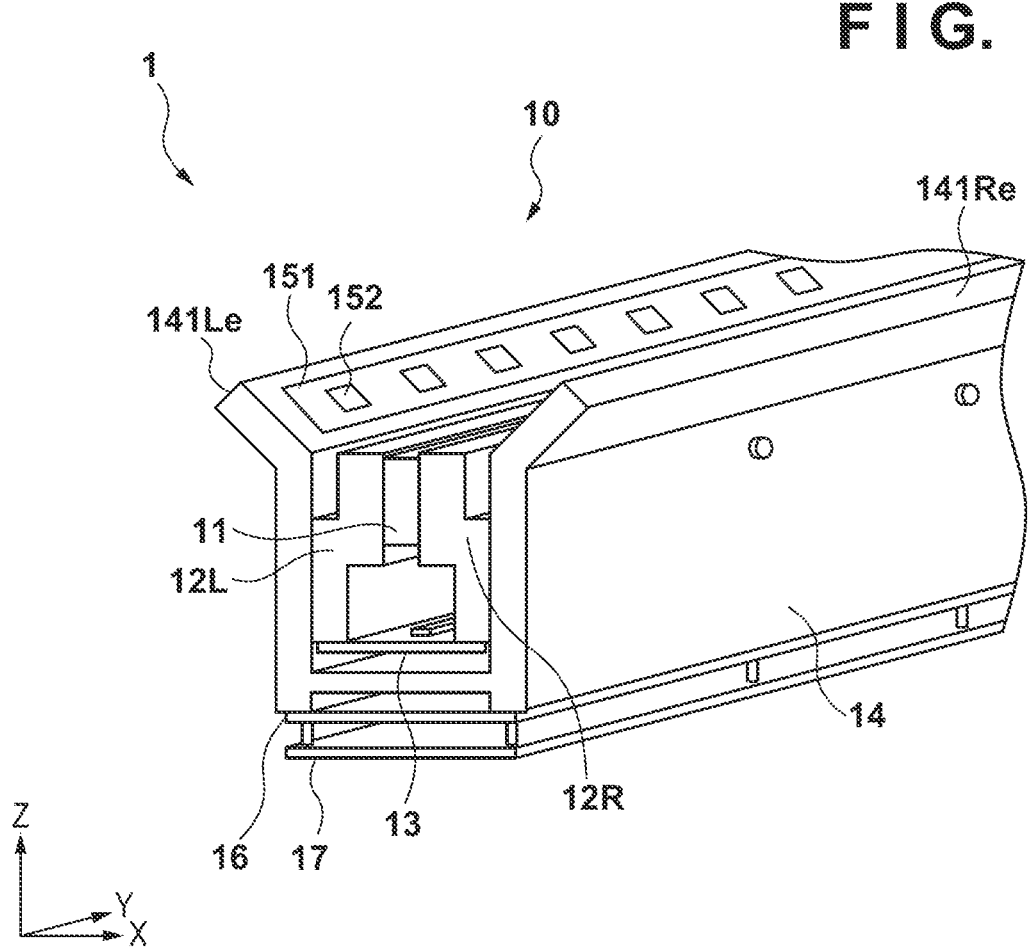
FIG. 4 is a perspective view of a line sensor assembly according to one embodiment.

FIG. 4 is a perspective view for illustrating the structure of a line sensor assembly 1 according to one embodiment. In order to facilitate an understanding of the structure, an X-axis, a Y-axis and a Z-axis that are orthogonal to each other are shown in the diagram. Hereinafter, the X-axis direction may be referred to as the direction in which an inner side supporting member 12 sandwiches a rod lens array 11, or simply as the sandwiching direction. Also, the Y-axis direction may be referred to as the direction of the array of the rod lens array 11, or simply as the array direction. Furthermore, the Z-axis direction may be referred to as the direction of the optic axis of the rod lens array 11, or simply as the optic axis direction. Also, the line sensor assembly 1 has an elongated structure extending in the Y direction.

Note that, herein, expressions indicating directions are used for indicating relative positional relationships. For example, expressions such as "right" or "right side" corresponds to a +X direction, and expressions such as "left" or "left side" corresponds to a −X direction. Also, for example, expressions such as "up" or "upward" corresponds to a +Z direction, and expressions such as "down" or "downward" corresponds to a −Z direction.

The line sensor assembly 1 includes the outer side supporting member 14. The outer side supporting member 14 has an elongated shape extending in the array direction, and is disposed so as to sandwich two inner side supporting members 12L and 12R, which will be discussed later, and supports the two inner side supporting members 12L and 12R. In one embodiment, the outer side supporting member 14 corresponds to the casing of the line sensor assembly 1, and each element is fixed directly or indirectly to the outer side supporting member 14. In the example in FIG. 4, the outer side supporting member 14 has a mirror-image symmetrical shape.

The lighting apparatus 10 that is included in the line sensor assembly 1 irradiates light onto an object to be measured. The configuration of the lighting apparatus 10 is as already been described. The lighting apparatus 10 is elongated, and can be disposed on at least one elongated outer side supporting member 14. FIG. 4 shows such an example, with two lighting apparatuses 10 being fixed to sloping surfaces respectively formed on sloping portions 141Le and 141Re of the outer side supporting member 14. Adopting such a configuration enables the elongated lighting apparatus 10 to irradiate light onto an object (not shown) that can be placed upward of the rod lens array 11. Also, a light transmissive plate material (not shown) such as a glass plate can be provided between the object and the line sensor assembly 1. The lighting apparatus 10 can be provided upward of the rod lens array 11. A shadow is thereby prevented from occurring when the lighting apparatus 10 irradiates light onto the object.

The lens array that is included in the line sensor assembly 1 condenses the light irradiated toward the object from the lighting apparatus 10, and guides the light to a line sensor 13. In the example in FIG. 4, the rod lens array 11 is used as a lens array. The line sensor assembly 1 is able to determine the amount or color of the light from the object, by detecting the light condensed by the rod lens array 11. For example, the color, reflectance or transmittance of the object can be measured by detecting the light reflected by the object or the light transmitted by the object. As an example, the line sensor assembly 1 is able to read an image printed on a printing medium (e.g., paper).

The rod lens array 11 includes a plurality of rod lenses arrayed in a predetermined direction (Y direction in the present embodiment). The individual rod lenses are disposed in a line with the light incident surfaces facing in the Z direction, such that the optic axes are parallel. That is, the rod lens array 11 has an elongated structure extending in the array direction. Adopting such a configuration enables measurement to be performed at one time on a long linear area on the object that passes upward of the rod lens array 11. Although the rod lenses are disposed in one row in the present embodiment, two or more rows of rod lenses may be arrayed. Also, although not illustrated, the rod lens array 11 may have a frame within which the arrayed rod lenses are housed.

The line sensor 13 that is included in the line sensor assembly 1 detects the light condensed by the lens array. That is, the line sensor 13 is irradiated by the lighting apparatus 10, and is able to detect light reflected by the object or light transmitted by the object. The line sensor 13 is fixed on the optical path of the rod lens array 11, so as to receive the light condensed by the rod lens array 11. In the present embodiment, the line sensor 13 has a configuration that enables light condensed by the elongated rod lens array 11 to be detected at one time. In the present embodiment, the line sensor 13 has an elongated structure that extends in the array direction (Y direction) of the rod lens array 11. For example, the line sensor 13 can have a structure in which a plurality of photoelectric conversion elements (e.g., photodiodes) are arrayed in the array direction (Y direction) of the rod lens array 11. A CCD or CMOS sensor, for example, can be used as the line sensor 13. The configuration of the line sensor 13 is not particularly limited, and an area sensor in which a plurality of photoelectric conversion elements are arrayed in a matrix or houndstooth pattern, for example, may be used. Also, light detection elements such as PIN sensors or MIS sensors may be used as the photoelectric conversion elements, instead of photodiodes.

In the example in FIG. 4, the rod lens array 11 is fixed so to be sandwiched by the two inner side supporting members 12L and 12R. Also, the line sensor 13 is fixed directly or indirectly to at least one of the two inner side supporting members 12L and 12R. The two inner side supporting members 12L and 12R each have an elongated structure extending in the array direction. The outer side supporting member 14 supports the two inner side supporting members 12L and 12R, and the rod lens array 11 and the line sensor 13 are thus also fixed to the outer side supporting member 14, which is the casing.

The line sensor assembly 1 may be provided with other configurations. For example, the line sensor assembly 1 shown in FIG. 4 has mounting substrates 16 and 17 that transmit the results of detection by the line sensor 13 externally and supply power to the line sensor 13 or the lighting apparatus 10.

The line sensor assembly 1 according to the present embodiment can be used as follows. For example, while the object is being relatively scanned with respect to the line sensor assembly 1, the lighting apparatus 10 irradiates the object. Reflected light from the object is condensed by the rod lens array 11 and detected by the line sensor 13. Thereafter, the mounting substrates 16 and 17 generate signals that are based on the results of detection by the line sensor 13, and output the signals externally. The type of signal that is output externally is not particularly limited, and image data showing an image of the object (image on a printing medium, etc.), a signal indicating the shift of the detection result from a reference value, and the like are given as examples. As a specific example, reading of a printing medium can be performed, by providing a detection surface (e.g., surface of light transmissive plate material) upward of the line sensor assembly 1, and the line sensor 13 detecting light while moving the printing medium over the detection surface. In the example in FIG. 4, the line sensor 13 detects reflected light from the object, but the line sensor 13 may detect light irradiated onto the object from the lighting apparatus 10 and transmitted by the object.

Figure 5:
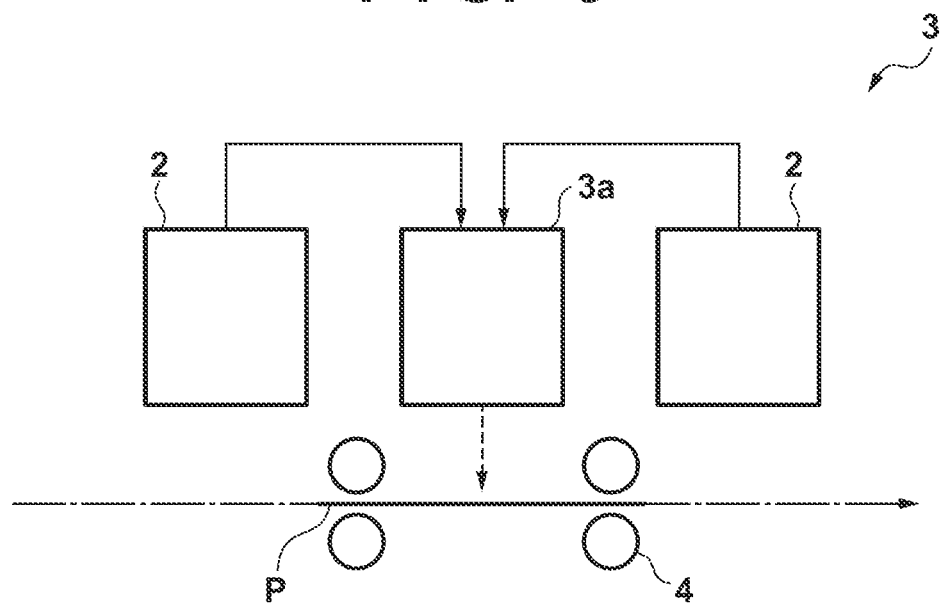
FIG. 5 is a schematic view of a printing apparatus according to one embodiment.

Such a line sensor assembly can be used as a constituent element of a reading apparatus or a printing apparatus. FIG. 5 shows an example of a reading apparatus 2 that includes the line sensor assembly 1 and a printing apparatus 3.

The reading apparatus 2 includes the line sensor assembly 1 and an output unit that outputs read data obtained by the line sensor assembly 1. The output unit is able to generate signals that are based on the results of detection by the line sensor 13, and output read data externally. For example, the abovementioned mounting substrates 16 and 17 can be used as the output unit.

The printing apparatus 3 includes the reading apparatus 2, a printing unit 3a that prints onto media based on the result of reading by the reading apparatus 2, and a conveying unit that conveys the media. The printing unit 3a is able print text, images or the like on media P (e.g., paper) with a suitable method such as an inkjet method or an electrophotographic method. Also, conveyance rollers 4 that convey the media from upstream to downstream can be used as the conveying unit. Also, in one embodiment, the conveying unit may move the printing unit 3a relative to the media, or may move the both the media and the printing unit 3a. In one embodiment, the printing apparatus 3 is able to perform copy processing, and, in this case, the printing unit 3a prints images read by the reading apparatus 2 onto the media. Also, in one embodiment, the printing apparatus 3 is able to perform feedback control. For example, the reading apparatus 2 is able to perform reading on media that has undergone printing by the printing unit 3a, and transmit read data to the printing apparatus 3. Based on this read data, the printing apparatus 3 is able to check the printing state onto the media, and is able to control the printing parameters at the time of the next printing.

As a specific example, a configuration will be described in which the reading apparatus 2 performs reading on the media P, and the printing unit 3a prints onto the media P that has been read by the reading apparatus 2, based on the read data. For example, the printing position onto the media P by the printing unit 3a can be controlled, based on the result of reading the media P by the reading apparatus 2. Also, the parameters for printing onto the media P by the printing unit 3a can be controlled, based on the result of reading the media P by the reading apparatus 2. Furthermore, the printing unit 3a is able to print information (e.g., text information or graphic information) that is based on the result of reading the media P by the reading apparatus 2 onto the media P.

For example, the reading apparatus 2 is able to read a mark given to the media P. In one embodiment, an alignment mark to be used in positioning at the time of printing is given in advance to the media P. The reading apparatus 2 may, by reading the alignment mark, detect a shift of the media P from a reference position based on the reading position thereof, and transmit the detection result to the printing unit 3a as read data, for example. The printing unit 3a is able to print text, images or the like at a more accurate position, by adjusting the printing position based on the shift of the media P from the reference position. According to the present embodiment, in the case where printing is performed on both sides of the media P, for example, the printing positions on the front side and the back side can be more accurately aligned. Also, because printing of text, images or the like in each process can be performed at a more accurate position, in the case of printing in multi-layers on the media P with a plurality of processes (multi-layered printing), for example, the overlapping of text, images or the like printed in each process can be prevented. Note that the shape of the alignment mark may be a cross (+) mark, a circle (○) mark or the like, for example.

As another example of the mark, the media P may have a barcode. In this case, the media P can have a barcode that differs for every type (size, material, color, etc.) thereof. The printing unit 3a is able to perform printing according to the type of media P, as a result of the reading apparatus 2 reading the barcode and transmitting information on the type of media P to the printing unit 3a as read data. For example, the printing unit 3a may control the printing parameters at the time of printing (depth, color, etc. of text, images, etc.) or the like according to the type of media P. Also, for example, the printing unit 3a may print information such as a product name or the like onto the media P according to the type of media P. Furthermore, the printing unit 3a may print information corresponding to the barcode onto the media P. As an example, the printing unit 3a is able to print a product name corresponding to a barcode onto paper on which the barcode is printed.

The reading apparatus 2 may read an entry column (blank column) provided on the media P as another example of a mark. In one embodiment, the reading apparatus 2 reads the position of the entry column provided on the media P, and transmits the read data to the printing unit 3a. The printing unit 3a prints text so as to fit within the entry column of the media P, based on the read data. According to such a configuration, the printing unit 3a is able to print text and the like in alignment with the position of an entry column on the media P, and thus printed text can be prevented from extending outside the entry column.

As another example, the reading apparatus 2 may read information relating to the media P itself, such as position information of the media or color information of the media. As information relating to the media P itself, position, width, angle or color of an edge of the media P is given as an example. In one embodiment, the reading apparatus 2 reads a leading edge position of the media P in the conveyance direction, and transmits the read data to the printing unit 3a. The printing unit 3a is able to print images or the like at a more accurate position, by controlling the time at which printing of text, images or the like is started on the media P, based on the read data. Also, the printing unit 3a is able to perform so-called borderless printing by starting printing of text, images or the like from the leading edge position of the media P. In the case of performing borderless printing, the reading apparatus 2 may read both side edge positions and a trailing edge position, rather than only the leading edge position of the media P. Borderless printing can thereby be performed more accurately. Also, in one embodiment, the reading apparatus 2 reads a fold, a missing part or the like (hereinafter, fold or the like) of the media P, that is, a difference from the original shape of the media P, and transmits the reading result to the printing unit 3a as read data. The printing unit 3a is able to print a symbol indicating that the media P is a defect, in the case where there is a fold or the like in the media P. In the case where printing is performed by the printing unit 3a on a large volume of media P, a worker is thereby able to easily identify defects among the large volume of media P. Furthermore, in one embodiment, the reading apparatus 2 determines the type (size, material, color, etc.) of the media P, and transmits the result to the printing unit 3a as read data. The printing unit 3a is able to perform print according to the type of media P, based on the read data. In the case where the media P is paper, the printing unit 3a is able to perform printing after adjusting the hue and the like of the text, images or the like according to the paper quality, or print patterns that are suited to the color of the paper.

Note that the reading apparatus 2 and the printing apparatus 3 are capable of communicating with each other by cable connection, wireless connection or the like. Also, the media P may be paper in sheet form or paper in continuous form.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-152693, filed Aug. 7, 2017, and Japanese Patent Application No. 2018-141566, filed Jul. 27, 2018 which are hereby incorporated by reference herein in their entirety.

What is claimed is:

1. A line sensor apparatus comprising:
a casing;
a lighting apparatus;
a lens array configured to condense light irradiated toward an object from the lighting apparatus; and
a line sensor configured to detect the light condensed by the lens array,
wherein the lighting apparatus has an elongated first light emission unit and an elongated second light emission unit each extending in a longer side direction and a shorter side direction, and
wherein the first light emission unit and the second light emission unit have respective end portions in the longer side direction that are connected to each other via a restricting mechanism having a shape that restricts relative movement of the first and second light emission units in the shorter side direction.

2. The line sensor apparatus according to claim 1, wherein the restricting mechanism includes:
a protruding portion formed on the end portion of the first light emission unit; and
an engaging portion formed on the end portion of the second light emission unit which is engaged with the protruding portion.

3. The line sensor apparatus according to claim 1, wherein the restricting mechanism includes:
an interconnecting portion which connects the first light emission unit and the second light emission unit; and
connecting portions provided on the end portions of the first light emission unit and the second light emission unit which connect to the interconnecting portion.

4. The line sensor apparatus according to claim 1, wherein the shape is provided on a main surface of each of the first light emission unit and the second light emission unit.

5. The line sensor apparatus according to claim 1, wherein the first light emission unit and the second light emission unit have respective end portion surfaces opposing with each other, wherein the shape is provided on each of the end portion surfaces.

6. The line sensor apparatus according to claim 1, wherein the first light emission unit has a first end portion and a second end portion along the longer side direction, wherein the first end portion is connected to the second light emission unit, and
in the first light emission unit, an amount of light emission from the second end portion is larger than the first end portion.

7. The line sensor apparatus according to claim 1, wherein the first light emission unit has a first end portion along the longer side direction which is connected to the second light emission unit,
the second light emission unit has a second end portion along the longer side direction which is connected to the first light emission unit, and
an end face of the first end portion has the same size as an end face of the second end portion.

8. The line sensor apparatus according to claim 1, wherein the lighting apparatus further comprises an elongated third light emission unit and an elongated fourth light emission unit each extending in a longer side direction and a shorter side direction,
wherein the third light emission unit and the fourth light emission unit have respective end portions in the longer side direction that are connected to each other via a restricting mechanism having a shape that restricts relative movement of the third and fourth light emission units in the shorter side direction,
wherein the third and fourth light emission units are located at the opposite side of the first and second light emission units across from the lens array, and wherein the restricting mechanism of the first and second light emission units and the restricting mechanism of the third and fourth light emission units are located at different positions in the longer side direction.

9. The line sensor apparatus according to claim 3,
wherein the connecting portions are holes each formed on the end portion of the first light emission unit and the second light emission unit.

10. The line sensor apparatus according to claim 5,
wherein the first light emission unit has a raised portion on the end portion surface, and the second light emission unit has a recessed portion which engages the raised portion.

11. A reading apparatus comprising:
a line sensor apparatus comprising:
   a casing,
   a lighting apparatus,
   a lens array configured to condense light irradiated toward an object from the lighting apparatus, and
   a line sensor configured to detect the light condensed by the lens array,
   wherein the lighting apparatus has an elongated first light emission unit and an elongated second light emission unit each extending in a longer side direction and a shorter side direction, and
   wherein the first light emission unit and the second light emission unit have respective end portions in the longer side direction that are connected to each other via a restricting mechanism having a shape that restricts relative movement of the first and second light emission units in the shorter side direction, and
an output unit configured to output read data obtained by the line sensor assembly.

12. A printing apparatus comprising:
a reading apparatus configured to read a medium, the reading apparatus comprising:
   a line sensor apparatus comprising:
      a casing,
      a lighting apparatus,
      a lens array configured to condense light irradiated toward an object from the lighting apparatus, and
      a line sensor configured to detect the light condensed by the lens array,
      wherein the lighting apparatus has an elongated first light emission unit and an elongated second light emission unit each extending in a longer side direction and a shorter side direction, and
      wherein the first light emission unit and the second light emission unit have respective end portions in the longer side direction that are connected to each other via a restricting mechanism having a shape that restricts relative movement of the first and second light emission units in the shorter side direction;
   an output unit configured to output read data obtained by the line sensor assembly;
a printing unit configured to print on the medium based on a result of reading by the reading apparatus; and
a conveying unit configured to convey the medium.

* * * * *